No. 754,823. PATENTED MAR. 15, 1904.
E. A. SMITH.
AUTOMATIC COASTING CYCLE.
APPLICATION FILED DEC. 3, 1903.
NO MODEL. 2 SHEETS—SHEET 1.
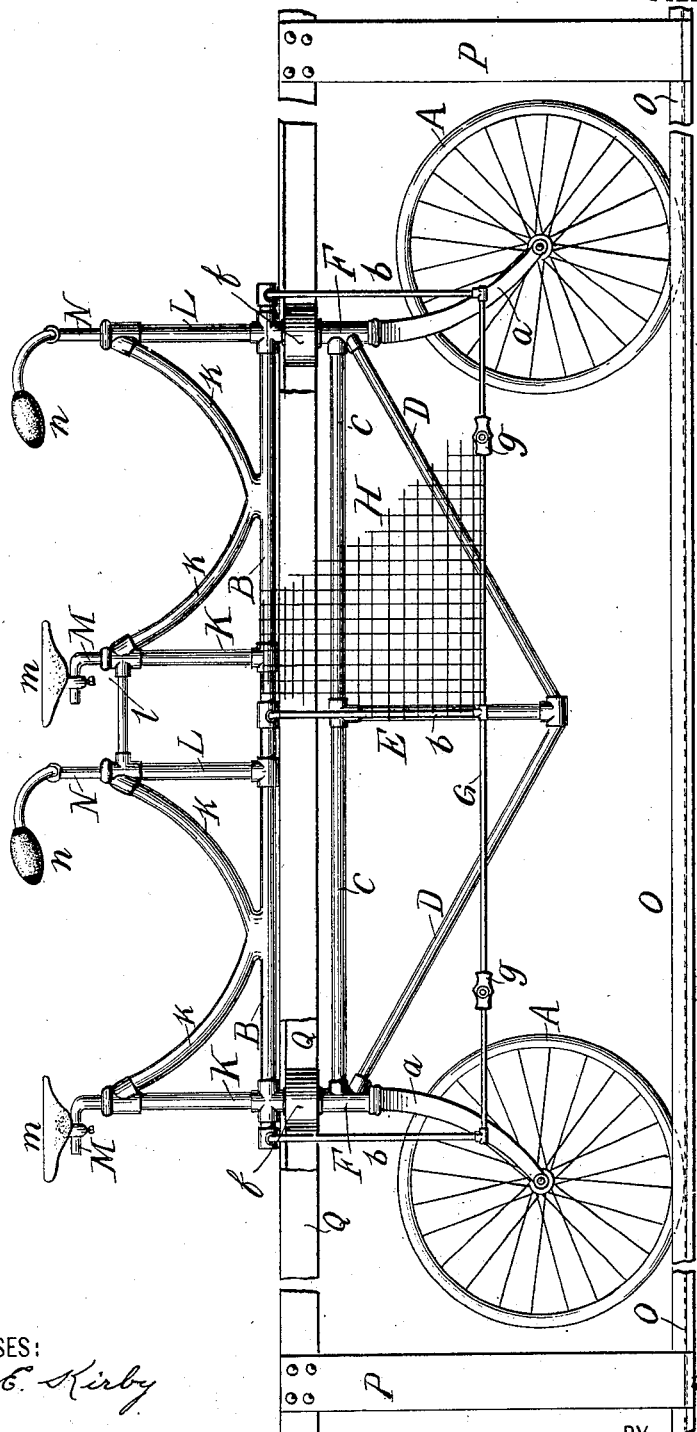
WITNESSES:
Henry E. Kirby
Walter C. Strang
INVENTOR
Edward A. Smith
BY E. W. Marshall
ATTORNEY No. 754,823. PATENTED MAR. 15, 1904.
E. A. SMITH.
AUTOMATIC COASTING CYCLE.
APPLICATION FILED DEC. 3, 1903.
NO MODEL. 2 SHEETS—SHEET 2.
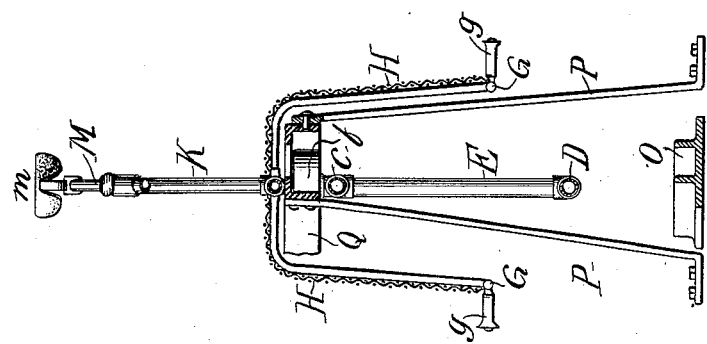
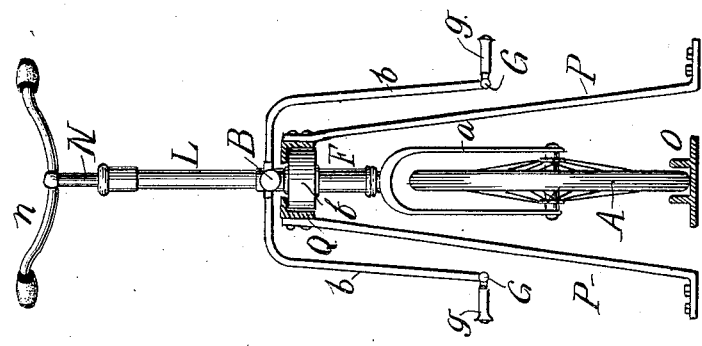

No. 754,823. Patented March 15, 1904.

UNITED STATES PATENT OFFICE.

EDWARD A. SMITH, OF NEW YORK, N. Y.

AUTOMATIC COASTING-CYCLE.

SPECIFICATION forming part of Letters Patent No. 754,823, dated March 15, 1904.

Application filed December 3, 1903. Serial No. 183,684. (No model.)

*To all whom it may concern:*

Be it known that I, EDWARD ANDERSON SMITH, a citizen of the United States, and a resident of New York city, in the county of New York and State of New York, have invented certain new and useful Improvements in Automatic Coasting-Cycles, of which the following is a specification.

My invention consists in the novel construction, combination, and arrangement of certain parts forming a bicycle and a supporting and guiding track therefor, as hereinafter more particularly described.

In the accompanying drawings, Figure 1 is a side elevation of my invention. Fig. 2 is a front view thereof; and Fig. 3 is a transverse vertical section, showing the relative position of certain parts when rounding a curve, as hereinafter described.

The invention consists of two principal parts, a bicycle and a supporting and guiding track.

The bicycle, which will be first described, is provided with front and rear wheels A A, mounted in forks $a\,a$, similar to the front forks of an ordinary bicycle. No driving mechanism is provided in connection with these wheels, as it is intended that the apparatus shall be operated by gravity. Connecting the wheels and supported thereby is a suitable framework analogous to the frame of an ordinary bicycle and like it preferably constructed of jointed or brazed tubing.

It will be evident that no particular form of frame is essential to the operation of my invention; but the form which I prefer to use is shown in Fig. 1 and comprises the horizontal members B and C, the inclined members D D, the vertical member E, and the vertical sleeves F F, to which the horizontal and inclined members are attached. The vertical member E is attached to and connects the horizontal member C with the inclined members D D. From the horizontal member B are suspended supports $b\,b\,b$, which sustain the horizontal rods G, which are provided with foot rests or supports $g\,g$, which may, if desired, be made to resemble the pedals of an ordinary bicycle. A suitable network H or other guard may be provided, extending from the member B to the rods G.

The upper ends of the wheel-forks $a\,a$ are inserted into the sleeves F F and secured therein in any suitable manner, so as to prevent their being too easily withdrawn therefrom and yet so as to permit motion.

Suitably attached to the horizontal member B are the uprights K K and L L, preferably constructed of tubing and connected by the braces $k\,k$ and $l$. Into the uprights K K are inserted saddle-posts M M, bearing saddles $m$ similar to the ordinary bicycle-saddles, and into the supports L L are inserted handle-bar posts N N, provided with handle-bars $n\,n$ similar to those of an ordinary bicycle. Both the saddle-posts and the handle-bar posts may be vertically adjustable, the handle-bar posts, however, in such a manner as to permit free circular motion, if desired, so that the handles may be turned from side to side or be immovable, as desired. It will be observed, however, that any operation of the handle-bars exercises no control over the wheel-forks or the direction of the motion of the bicycle, which is entirely controlled by external means, as hereinafter described.

At $f\,f$ are guide-shoes or rollers attached to the sleeves F F and preferably made revoluble in a horizontal plane, but secured against vertical movement.

The form of apparatus shown in the drawings is adapted for the use of two persons, similar to the ordinary tandem bicycle; but it is obvious that the same may be so constructed as to permit it to be used by one or any number of persons without departing from the essential features of my invention.

Having described the moving part of my invention, I will now describe the supporting and guiding track, which constitutes the stationary part thereof. This track consists of a grooved rail O, adapted to receive and guide the wheels A A. In straight portions of the track the groove should be made only wide enough to prevent unnecessary friction against the sides of the wheel-rims, so as to keep the wheels directed straight ahead; but on any curved portion of the track the groove should be slightly wider, as well as deeper, so as to direct the wheel and cause the same to follow the proper direction. On each side of the grooved rail and at a suitable distance therefrom are uprights P P, bearing at their upper ends guide-rails Q Q, suitably attached thereto. These guide-rails are formed of angle-irons with unequal sides, the longer sides placed vertically, with the shorter sides facing inward. The space between the vertical portion is sufficient to clear the guide-shoes or rollers $f f$, and the inwardly-projecting sides of the guide-rails go over the guide shoes or rollers with a clearance between the shoes and the guides.

It is intended that the track above described shall be laid upon an inclined way or upon a way comprising a series of descents and ascents, the ascents, however, being in the aggregate less than the descents and the said way and track being in the form of a loop or a spiral, as is usual in pleasure-railways, &c. The beginning of the track may be at the top of a tower or hill and may thence descend by a succession of falls and rises and around suitable curves until the surface of the ground is reached.

It will be observed that the horizontal members B and C of the frame are situated the former above and the latter below the plane of the guide-shoes or rollers $f f$ and guide-rails Q Q and that no vertical members connect the horizontal members B and C except at their ends. This construction is to permit the horizontal members to pass freely over and under the guide-rails Q Q upon rounding a curve.

The operation of my invention is as follows: The bicycle, being elevated by any well-known means to the top of the tower or hill at which the track begins, is placed in position, with the guide-shoes or rollers $f f$ between and under the rails Q Q and with the wheels A A in the groove of the rail O. The riders having mounted and secured a firm seat and hold, the bicycle, which has in the meantime been held, is started down the inclined plane leading from the top of the tower or hill. Its speed being accelerated by gravity, it is enabled to overcome the succeeding rise, which is of course not as great as the original height from which the first start was made, and upon overcoming this height the succeeding slope is descended, and so on until the momentum of the machine is exhausted by traversing a level stretch of track or ascending an incline at the end of the course and the bicycle comes to rest, ready to be again elevated to the top of the tower or hill. The guide-rails Q Q are so placed in relation to the grooved rail O as to keep the bicycle in a substantially vertical position while it is traveling in a straight line and to give it the proper inclination while it is rounding curves. The inwardly-projecting part of the guide-rails is not necessary, but is desirable, as it prevents the bicycle from jumping from the grooved rail from any cause.

It will be observed that the riders have no control whatever either of the speed or direction of the machine, whereby all danger from sudden turns or stoppages is avoided, even when the riders are persons entirely unfamiliar with bicycles and their management. The inclined planes should be so adjusted as to prevent undue speed being developed at any part of the course, but yet to permit of sufficient momentum being accumulated in each descent to mount the succeeding rise. A brake may be provided, if desired; but it is preferred not to apply the same, as by so doing it would be possible for a rider to so reduce the speed of the bicycle as to prevent its fully mounting one of the rises and to cause it to run back to the foot thereof.

Having thus described my invention, what I claim as new, and desire to secure by Letters Patent, is as follows:

1. A frame for cycles and the like, comprising sleeves F F, horizontal members B C, inclined members D D, a vertical member E, guide-shoes or rollers $f f$, seats or saddles, and handles or handle-bars; the said horizontal members B and C being situated respectively above and below the plane of the rollers $f f$, substantially as herein set forth.

2. A frame for cycles and the like, comprising sleeves F F, horizontal members B C, inclined members D D, a vertical member E, guide-shoes or rollers $f f$, seats or saddles, handles or handle-bars, supports $b b b$, a horizontal rod G, a network H, and foot-rests $g g$, substantially as herein set forth.

3. A cycle comprising a frame consisting of sleeves F F, horizontal members B C, inclined members D D, a vertical member E, horizontally-revolving wheels or rollers $f f$, vertically-revolving wheels mounted in forks which are pivotally attached to said frame, seats or saddles, and handles or handle-bars; the horizontal members B and C being respectively above and below the plane of the wheels or rollers, substantially as herein set forth.

4. A cycle comprising a frame consisting of sleeves F F, horizontal members B C, inclined members D D, a vertical member E, horizontally-revolving wheels or rollers $f f$, vertically-revolving wheels mounted in forks which are pivotally attached to said frame, seats or saddles, and handles or handle-bars, said vertically-revolving wheels and their forks being free from control by the handles or handle-bars, and the horizontal members B and C of the frame being situated respectively above and below the plane of the wheels $f f$, substantially as herein set forth.

5. A cycle comprising a frame consisting of sleeves F F, horizontal members B C, inclined members D D, a vertical member E, horizontally-revolving wheels or rollers $f f$, vertically-revolving wheels mounted in forks which are pivotally attached in said frame, seats or saddles, and handles or handle-bars, supports $b\ b\ b$, a horizontal rod G, a network H and foot-rests $g\ g$; said vertically-revolving wheels and their forks being free from control by the handles or handle-bars, and the horizontal members B and C of the frame being situated respectively above and below the plane of the wheels or rollers $f\ f$, substantially as herein set forth.

6. The combination with an automatic coasting-cycle, comprising a frame provided with guide-shoes or horizontal rollers, a saddle and handle-bars, and wheels mounted in forks which are pivotally attached to said frame, said forks being free from control by the handle-bars; of a track therefor, comprising a grooved rail adapted to receive the wheels of a cycle, and uprights on each side of said rail bearing guard-rails adapted to engage with guide-shoes or horizontal rollers on the upper part of the frame of a cycle.

7. The combination with an automatic coasting-cycle, comprising a frame consisting of sleeves F F, horizontal members B C, inclined members D D, a vertical member E, guide-shoes or horizontally-revolving rollers $f\ f$, seats or saddles, handles or handle-bars, and vertically-revolving wheels mounted in forks, which are pivotally attached to said frame, said horizontal members B and C being respectively above and below the plane of the rollers $f\ f$; of a track therefor comprising a grooved rail adapted to receive the vertically-revolving wheels of a cycle, and uprights on each side of said rail bearing guard-rails adapted to engage with guide-shoes or horizontally-revolving rollers on the upper part of the frame of a cycle.

8. The combination with an automatic coasting-cycle, comprising a frame provided with guide-shoes or rollers, a saddle and handle-bars, and wheels mounted in forks which are pivotally attached to said frame, said forks being free from control by the handle-bars; of a track therefor, comprising a grooved rail adapted to receive the wheels of a cycle, and uprights on each side of said rail bearing angular guard-rails adapted to engage with the guide-shoes or rollers on the upper part of the frame of a cycle to limit the upward and sidewise movement of the cycle.

In testimony whereof I have signed my name to this specification in the presence of two subscribing witnesses.

EDWARD A. SMITH.

Witnesses:
WALTER LIEBMAN,
HENRY E. KIRBY.